(12) United States Patent
Huang

(10) Patent No.: US 8,267,514 B1
(45) Date of Patent: Sep. 18, 2012

(54) STOP STRUCTURE FOR FOLDING GLASSES TEMPLE

(76) Inventor: Wen-Tse Huang, Kaohsiung (TW)

( * ) Notice: Subject to any disclaimer, the term of this patent is extended or adjusted under 35 U.S.C. 154(b) by 32 days.

(21) Appl. No.: 13/102,129

(22) Filed: May 6, 2011

(51) Int. Cl.
*G02C 5/22* (2006.01)

(52) U.S. Cl. .......................................... 351/153; 16/228

(58) Field of Classification Search .................. 351/153, 351/113, 111, 63, 41, 158; 16/228
See application file for complete search history.

(56) References Cited

U.S. PATENT DOCUMENTS

| | | | | |
|---|---|---|---|---|
| 2,853,924 A | * | 9/1958 | Herzfeld et al. ............... | 351/113 |
| 5,461,432 A | * | 10/1995 | Huang ........................... | 351/153 |
| 6,099,120 A | * | 8/2000 | De Lima ....................... | 351/153 |
| 8,029,133 B2 | * | 10/2011 | Chen ............................. | 351/153 |

* cited by examiner

*Primary Examiner* — Hung Dang
(74) *Attorney, Agent, or Firm* — Alan Kamrath; Kamrath IP Lawfirm, PA

(57) ABSTRACT

A stop structure for a folding glasses temple includes a glasses frame and a glasses temple. Two spaced lugs are formed on an outer lateral of the glasses frame, and a stop portion is provided between the two lugs. The glasses temple includes a head end connected to the glasses frame and a tail end adapted to be worn on an ear of a user. The head end of the glasses temple is pivotably connected to the glasses frame between the two lugs to allow the glasses temple to be folded inwards or unfolded outwards relative to the glasses frame. The stop portion stops the tail end of the glasses temple from contacting the glasses frame while folding inwards, thereby protecting the glasses frame and the glasses temple.

5 Claims, 6 Drawing Sheets

STOP STRUCTURE FOR FOLDING GLASSES TEMPLE

BACKGROUND OF THE INVENTION

1. Field of the Invention

The present invention relates to a stop structure for a folding glasses temple and, more particularly, to a stop structure that can prevent the glasses temples from contacting with the glasses frame while being folded.

2. Description of the Related Art

Existing glasses frame and temples are connected by hinges to form a pivotable structure. As shown in FIGS. 1 and 2, one lateral of a conventional glasses frame 10 is connected with a glasses temple 11 by a hinge mechanism 12, allowing the glasses temple 11 to be folded or unfolded so that it is convenient for the user to wear and carry the glasses around. However, when the glasses temple 11 is folded inwards, it may knock on the glasses frame 10 (FIG. 2).

Moreover, as the world has been more and more developed, the glasses went from having just practical needs to expressing personal taste and social status. Therefore, glasses play an important role in fashion industry. Since the inner sides of the glasses temples will make contact with the user's face while wearing, it is very likely that chemical secretions may get onto the glasses temples, and then get onto the glasses frame when the glasses temples contact the glasses frame, causing the glasses frame to loss the luster or color thereon and the material thereof to deteriorate.

Further, without a stop structure on the glasses, the glasses temple will lean against the glasses frame when the glasses temple is folded inwards, causing the original shape of the glasses temple to change.

BRIEF SUMMARY OF THE INVENTION

In order to overcome the deficiencies of the prior art, a primary objective of the present invention is to provide a stop structure for a folding glasses temple that is capable of preventing the glasses temples from contacting with the glasses frame while being folded, thereby protecting the appearance and the curve structure of the glasses.

To achieve the foregoing objective, a stop structure for a folding glasses temple of the present invention includes a glasses frame having two spaced lugs formed on an outer lateral of the glasses frame. A stop portion is formed between outer sides of the two lugs of the glasses frame. A glasses temple includes a head end pivotably connected to and located between the two lugs of the glasses frame and a tail end adapted to be worn on an ear of a user. The glasses temple is pivotable relative to the glasses frame between an unfold position and a folded position. The head end of the glasses temple abuts against the stop portion to prevent the tail end of the glasses temple from contacting the glasses frame when the glasses temple is in the folded position.

In a preferred form, a bending elastic piece extends from the outer lateral of the glasses frame and includes an outer end extending between the two lugs. The stop portion is formed on the outer end of the elastic piece.

Preferably, the head end of the glasses temple includes an upper face having a recessed portion, and the recessed portion is engaged with the elastic piece when the glasses temple is in the folded position.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
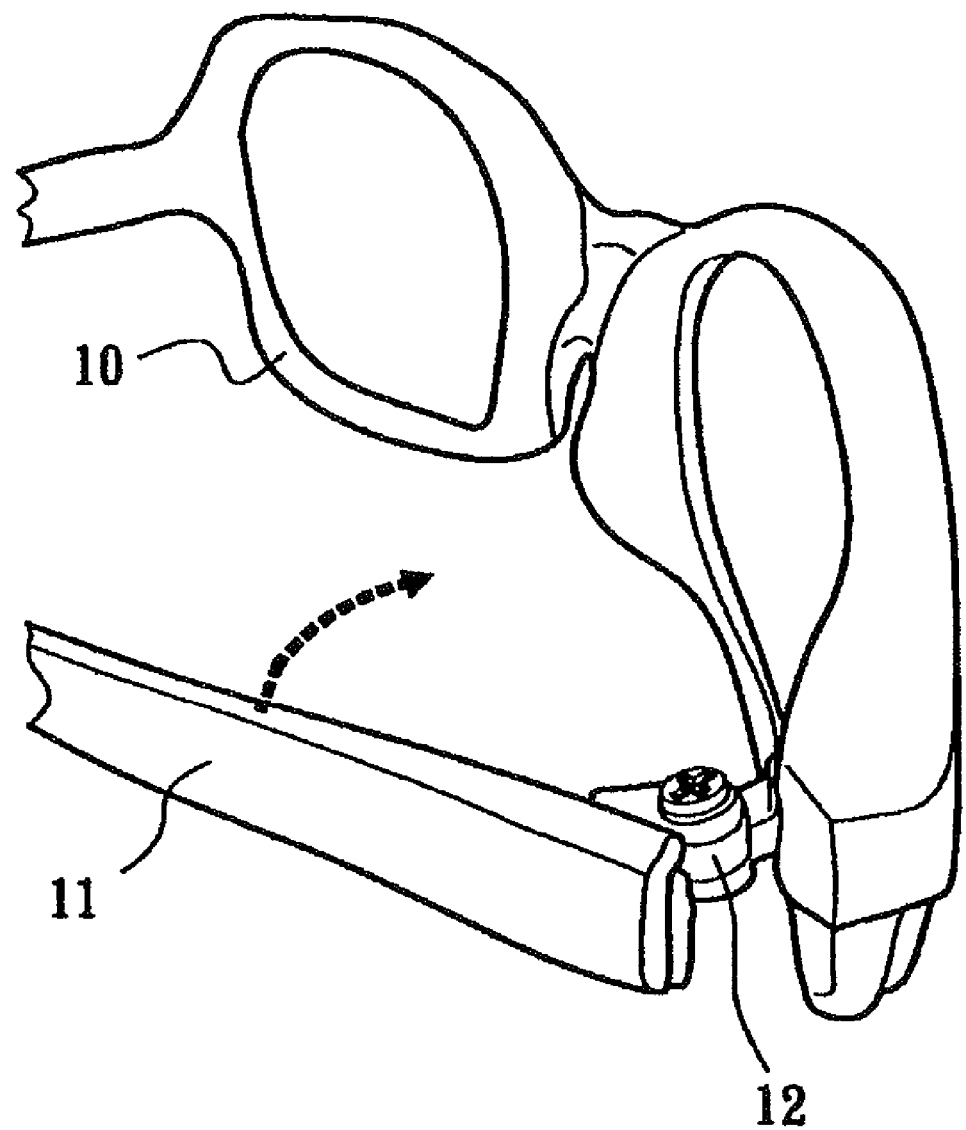
FIG. 1 shows a schematic view illustrating a conventional glasses temple folding structure.
Figure 2:
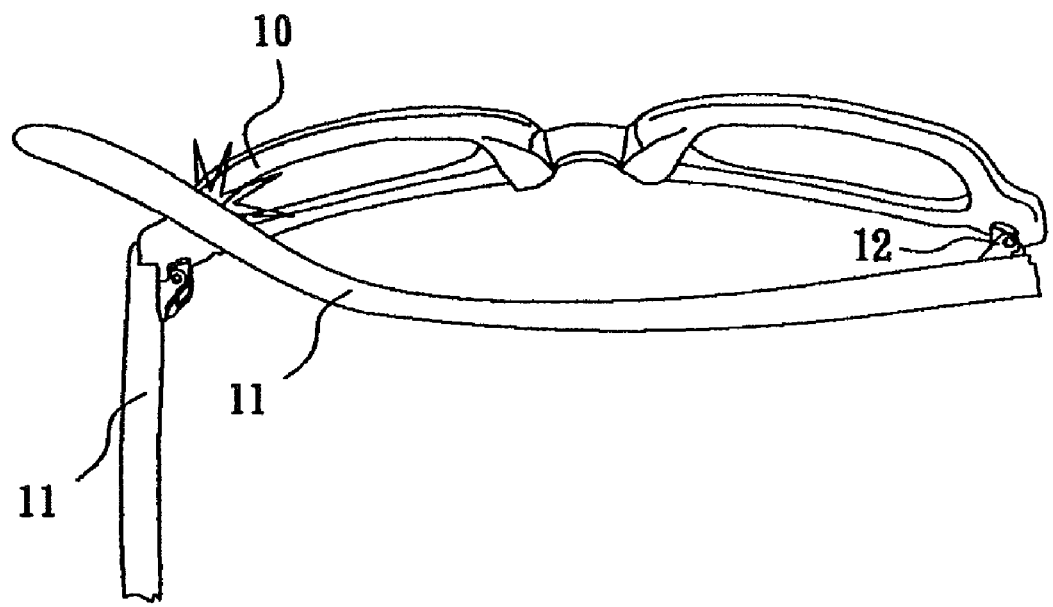
FIG. 2 shows a schematic view illustrating a conventional glasses temple contacting a glasses frame while folding inwards.
Figure 3:
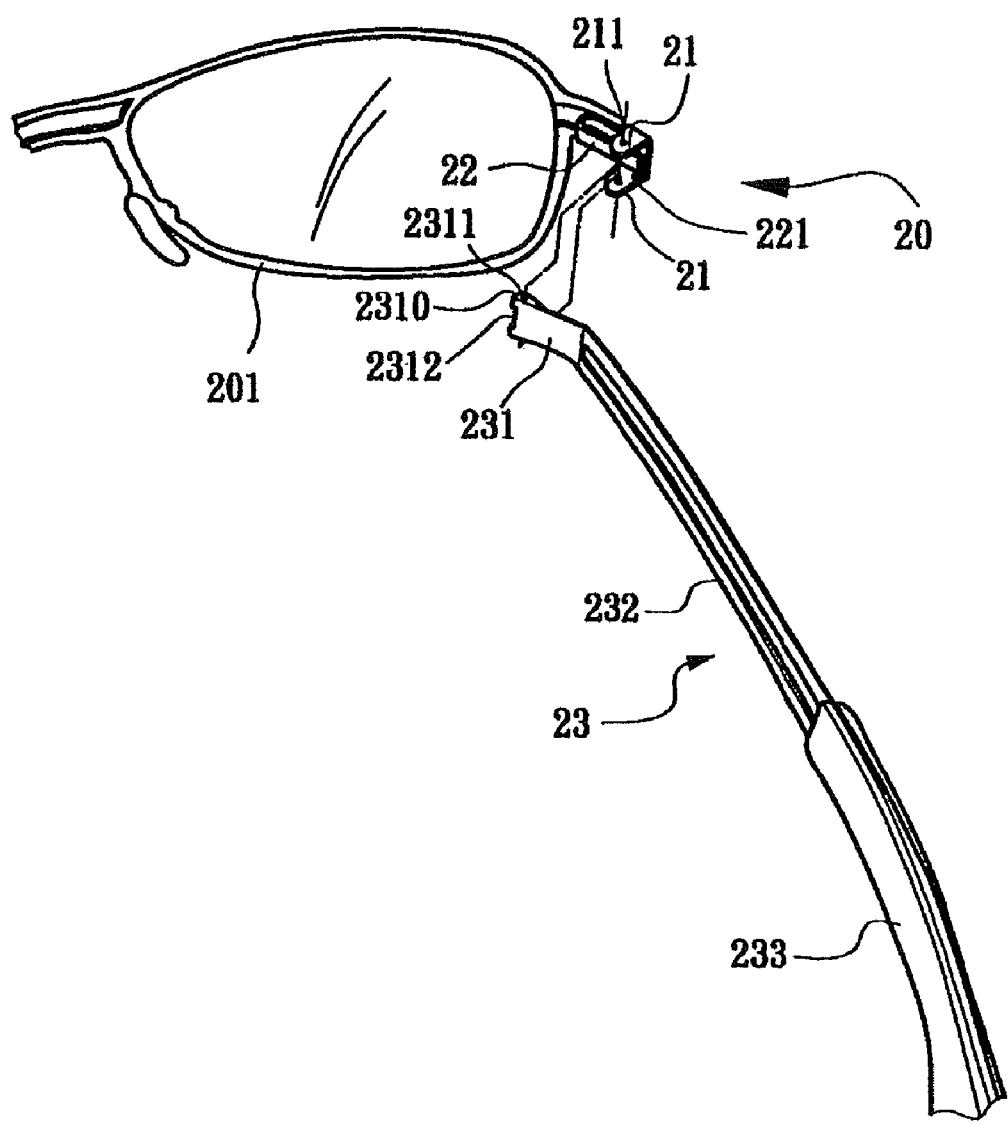
FIG. 3 shows an exploded, perspective view of a stop structure for a folding glasses temple according to the preferred teachings of the present invention.
Figure 4:
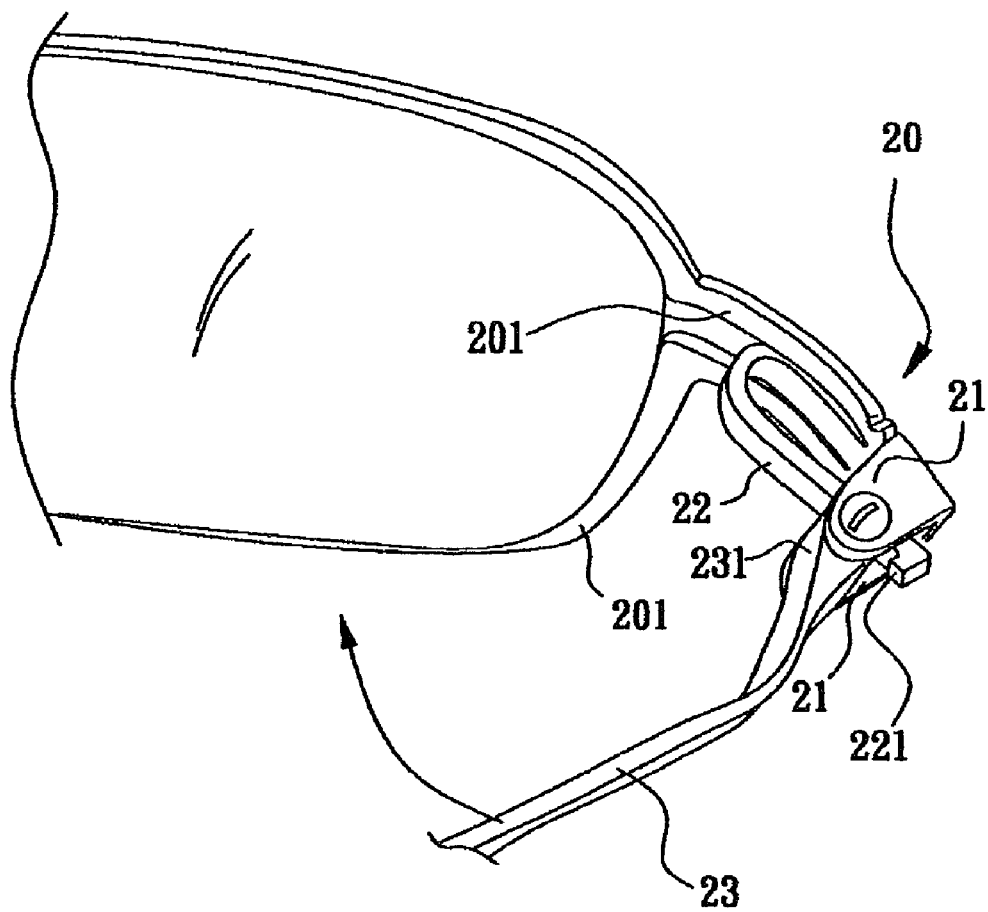
FIG. 4 shows a partial, perspective view of the stop structure for a folding glasses temple of FIG. 3.

A stop structure for a folding glasses temple according to the preferred teachings of the present invention is shown in FIGS. 3 through 6 of the drawings and generally designated 20. The stop structure 20 includes a glasses frame 201 and a glasses temple 23. Two spaced lugs 21 are formed on an outer lateral of the glasses frame 201, and each of the lugs 21 has a threaded hole 211. A U-shaped elastic piece 22 extends from the outer lateral of the glasses frame 201 and includes an outer end extending between the two lugs 21. A stop portion 221 is formed on the outer end of the elastic piece 22 and disposed between outer sides of the two lugs 21. In the embodiment, the outer lateral of the glasses frame 201, the two lugs 21, the elastic piece 22, and the stop portion 221 are integrally formed by a metal sheet material through a sheet metal forming process. However, it can be appreciated that the stop portion 221 can be directly formed between the outer sides of the two lugs 21.

Figure 5:
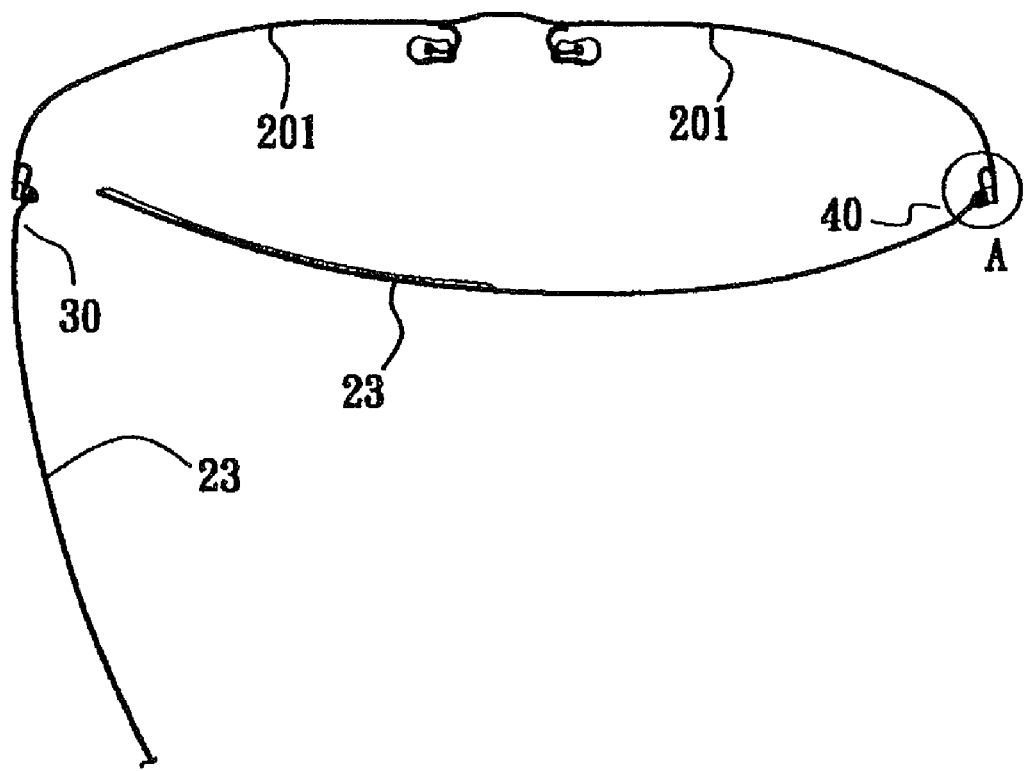
FIG. 5 shows a schematic view of a pair of glasses including the stop structure for a folding glasses temple of FIG. 3 with a glasses temple folded inwards relative to a glasses frame.
Figure 6:
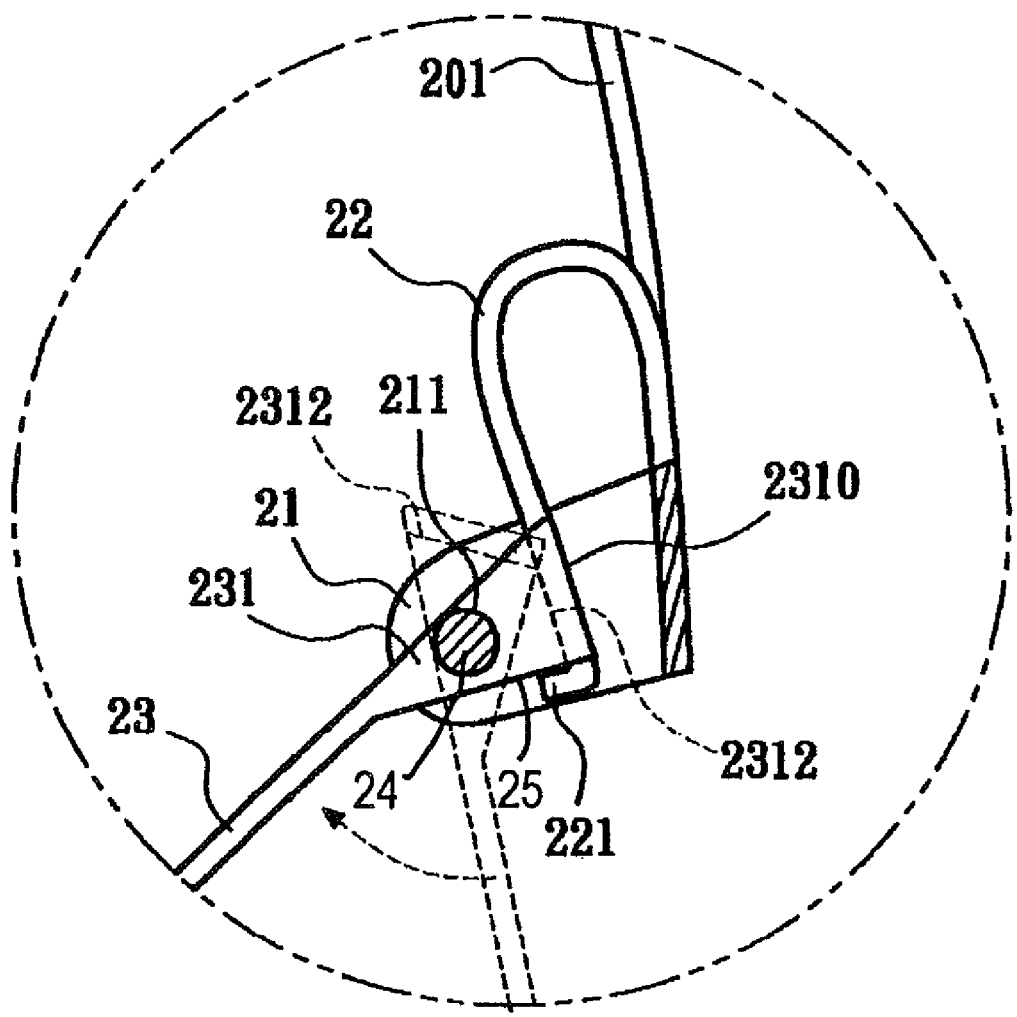
FIG. 6 shows an enlarged view of a circled portion of A of FIG. 5 and a schematic view illustrating the folding of the glasses temple thereof.

The glasses temple 23 includes a head end 231 received between the two lugs 21, a tail end 233 for wearing on an ear of a user, and a body portion 232 intermediate the head and tail ends 231 and 233. A through hole 2311 is formed in the head end 231 and aligns with the threaded holes 211 of the lugs 21 when the head end 231 is received between the two lugs 21. A fastener 24 extends through the through hole 2311 and the threaded holes 211 to pivotably connect the head end 231 of the glasses temple 23 to the glasses frame 201 between the two lugs 21, thereby allowing the glasses temple 23 to be pivoted inwards or outwards relative to the glasses frame 201 about an axis defined by the fastener 24. That is, the glasses temple 23 is capable of rotating relative to the glasses frame 201 between an unfold position 30 and a folded position 40 as shown in FIG. 5. When the glasses temple 23 is in the unfold position 30, the glasses temple 23 is substantially perpendicular to the glasses frame 201 to allow the user to wear the glasses. On the other hand, when the glasses temple 23 is in the folded position 40, the glasses temple 23 is substantially parallel to the glasses frame 201 for easy storage. In addition, when the glasses temple 23 is in the folded position 40, an outer edge 25 of the head end 231 will make contact with the stop portion 221 as shown in FIG. 6 and thereby preventing the body portion 232 and the tail end 233 of the glasses temple 23 from contacting the glasses frame 201. In the embodiment, an upper face 2310 of the head end 231 is thicker, and a recessed portion 2312 is formed in the upper face 2310 such that the recessed portion 2312 can receive and engaged with the elastic piece 22 when the glasses temple 23 is in the folded position 40 (see FIG. 6), thereby increasing the positioning effect of glasses temple 23 in the folded position 40. Further, since the bending elastic piece 22 is received in the recessed portion 2312 when the glasses temple 23 is in the folded position 40, a precise stop effect can be obtained.

According to stop structure 20 for a folding glasses temple of the present embodiment, the glasses temple 23 is stopped by the stop portion 221 after folded inwards such that the glasses temple 23 is prevented from being over folded and contacting the glasses frame 201, thereby protecting the appearance and the curve structure of the glasses frame 201 and the glasses temple 23.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A stop structure for a folding glasses temple comprising:
a glasses frame including two spaced lugs formed on an outer lateral of the glasses frame, with a stop portion formed between outer sides of the two lugs; and
a glasses temple including a head end pivotably connected to and located between the two lugs of the glasses frame and a tail end adapted to be worn on an ear of a user, with the glasses temple being pivotable relative to the glasses frame between an unfold position and a folded position, with the head end abutting against the stop portion to prevent the tail end of the glasses temple from contacting the glasses frame when the glasses temple is in the folded position.

2. The stop structure for a folding glasses temple according to claim 1, with a bending elastic piece extending from the outer lateral of the glasses frame and including an outer end extending between the two lugs, and with the stop portion formed on the outer end of the elastic piece.

3. The stop structure for a folding glasses temple according to claim 2, with the head end of the glasses temple including an upper face having a recessed portion, and with the recessed portion engaged with the elastic piece when the glasses temple is in the folded position.

4. The stop structure for a folding glasses temple according to claim 3, with the glasses frame, the two lugs, the elastic piece, and the stop portion are integrally formed by a metal sheet material.

5. The stop structure for a folding glasses temple according to claim 2, with the glasses frame, the two lugs, the elastic piece, and the stop portion are integrally formed by a metal sheet material.

* * * * *